(12) United States Patent
Schiemann

(10) Patent No.: US 11,502,386 B2
(45) Date of Patent: Nov. 15, 2022

(54) ATTACHMENT ARRANGEMENT OF AN ANTENNA DEVICE FOR A VEHICLE

(71) Applicant: Hirschmann Car Communication GmbH, Neckartenzlingen (DE)

(72) Inventor: Rainer Schiemann, Esslingen (DE)

(73) Assignee: Hirschmann Car Communication GmbH, Neckartenzlingen (DE)

(*) Notice: Subject to any disclaimer, the term of this patent is extended or adjusted under 35 U.S.C. 154(b) by 197 days.

(21) Appl. No.: 16/903,937

(22) Filed: Jun. 17, 2020

(65) Prior Publication Data

US 2020/0403292 A1 Dec. 24, 2020

(30) Foreign Application Priority Data

Jun. 19, 2019 (DE) .......................... 102019116652.7

(51) Int. Cl.
*H01Q 1/20* (2006.01)
*B60R 11/02* (2006.01)
*H01Q 1/32* (2006.01)

(52) U.S. Cl.
CPC ............... *H01Q 1/20* (2013.01); *B60R 11/02* (2013.01); *H01Q 1/3275* (2013.01)

(58) Field of Classification Search
CPC combination set(s) only.
See application file for complete search history.

(56) References Cited

U.S. PATENT DOCUMENTS

| | | | |
|---|---|---|---|
| 7,436,367 B2 * | 10/2008 | Blickle | H01Q 1/3275 343/711 |
| 8,441,401 B2 * | 5/2013 | Steinkamp | H01Q 1/1214 343/715 |
| 8,511,634 B2 * | 8/2013 | Lerchner | H01Q 1/1214 343/715 |
| 10,148,004 B2 | 12/2018 | Taira | |
| 10,964,999 B2 * | 3/2021 | Su | H01R 43/20 |
| 2003/0231140 A1 * | 12/2003 | Haussler | H01Q 1/1214 343/715 |
| 2008/0074342 A1 * | 3/2008 | Lindackers | H01Q 1/1214 343/906 |
| 2011/0133047 A1 | 6/2011 | Lerchner | |
| 2011/0267243 A1 | 11/2011 | Steinkamp et al. | |
| 2013/0082158 A1 | 4/2013 | Sato | |
| 2018/0026328 A1 | 1/2018 | Iwakami | |
| 2018/0309184 A1 * | 10/2018 | Iwakami | H01Q 1/1207 |

FOREIGN PATENT DOCUMENTS

DE 202009009067 U 11/2009

OTHER PUBLICATIONS

European Search Report, dated Nov. 9, 2020, 10 pages.

* cited by examiner

*Primary Examiner* — Monica E Millner
(74) *Attorney, Agent, or Firm* — Barley Snyder

(57) ABSTRACT

An antenna device for a vehicle includes a base plate, an expansion element formed by a first expansion element part and a second expansion element part mated with the first expansion element part, and an actuating element cooperating with the base plate and the expansion element. Each of the first expansion element part and the second expansion element part has a flat area, a side arm protruding at an angle from the flat area, and a laterally open breakthrough in the flat area. The laterally open breakthrough of each of the first expansion element part and the second expansion element part when mated forms a single passage opening for the actuating element.

17 Claims, 2 Drawing Sheets

ATTACHMENT ARRANGEMENT OF AN ANTENNA DEVICE FOR A VEHICLE

CROSS-REFERENCE TO RELATED APPLICATION

This application claims the benefit of the filing date under 35 U.S.C. § 119(a)-(d) of German Patent Application No. 102019116652.7, filed on Jun. 19, 2019.

FIELD OF THE INVENTION

The present invention relates to an antenna device and, more particularly, to an antenna device for a vehicle.

BACKGROUND

An antenna device for a vehicle is known from US 2011/0267243 A1 (hereinafter "the '243 publication"). The antenna device is placed onto the upper side of a bodywork surface, in particular a vehicle roof, wherein the underside of a base plate of the antenna device comes to rest on the upper side of the bodywork surface. An area of the base plate is accessible from the underside of the bodywork surface because this has a corresponding cutout. From the underside of the bodywork surface, an expansion element is brought into operative connection with the base plate, wherein the expansion element is actuated by an actuating element and expands, as a result of which, by virtue of the expanding effect, the antenna device is permanently, but releasably, arranged and fixed on the upper side of the bodywork surface.

Two expansion elements which cooperate with a sleeve, a clamping element, and the actuating element are present in the '243 publication. The two expansion elements are both elements which are formed and act individually independently and which are both arranged in a cross shape, wherein this cross shape is specified by the clamping element, which is likewise formed in a cross shape. Each individual expansion element is effective individually, which means that, in this prior art, even only one single expansion element would be sufficient for permanently arranging and fixing the roof antenna. In its central area, the expansion element is configured to be flat and has a fully enclosed opening through which the actuating element can be guided. A number of angled areas protrude from the central flat area of the respective expansion element, these angled areas achieving a spring effect and being required during the process of feeding the preassembled roof antenna through the cutout in the bodywork surface.

After the two expansion elements have been arranged in a cross shape on the underside by the sleeve and the clamping element, they are firstly held by the actuating element (screw). This can be seen in FIG. 4 of the '243 publication. In this state, the roof antenna prepared in this manner is placed onto the upper side of the bodywork surface from above and the prepared attachment arrangement is fed through the cutout in the bodywork surface, such that this attachment arrangement is accessible from the underside of the bodywork surface While the attachment arrangement is being fed through the cutout in the bodywork surface, the protruding side arms of the two expansion elements, which arms are angled in their axial progression, are pressed together and move back into their starting position again when the underside of the base plate has come to rest on the upper side of the bodywork surface. This process is depicted in FIGS. 5-7 of the '243 publication. After this movement back, the front ends of an angled area of the side arms rest against the underside of the bodywork surface beside the recess (also referred to as a cutout), thus giving rise to a supporting effect if the actuating element is actuated further. Through this further actuation, which is shown in FIG. 8 of the '243 publication, the underside of the base plate is pulled further in the direction of the upper side of the bodywork surface and is permanently fixed as a result.

The two expansion elements manufactured separately from one another have, primarily due to their multiple angled regions, an extremely complex geometrical shape both in the longitudinal direction and in the transverse direction and are therefore difficult to manufacture. Furthermore, the entire attachment arrangement consists not only of these two expansion elements, but rather also additionally of the sleeve and the clamping element, so that the two expansion elements do not function without the clamping element or the sleeve being present. Thus, if the clamping element or sleeve were to be forgotten during mounting, the two expansion elements would not function. The two known expansion elements are mated together in the axial direction of the actuating element to form the cross shape. Furthermore, the passage opening for the actuating element is closed in the circumferential direction.

Similar attachment arrangements for arranging and attaching antenna devices, in particular roof antennas, on bodywork surfaces, in particular a roof, of vehicles are known from US 2013/0082158 A1 and US 2018/0026328 A1.

SUMMARY

An antenna device for a vehicle includes a base plate, an expansion element formed by a first expansion element part and a second expansion element part mated with the first expansion element part, and an actuating element cooperating with the base plate and the expansion element. Each of the first expansion element part and the second expansion element part has a flat area, a side arm protruding at an angle from the flat area, and a laterally open breakthrough in the flat area. The laterally open breakthrough of each of the first expansion element part and the second expansion element part when mated forms a single passage opening for the actuating element.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
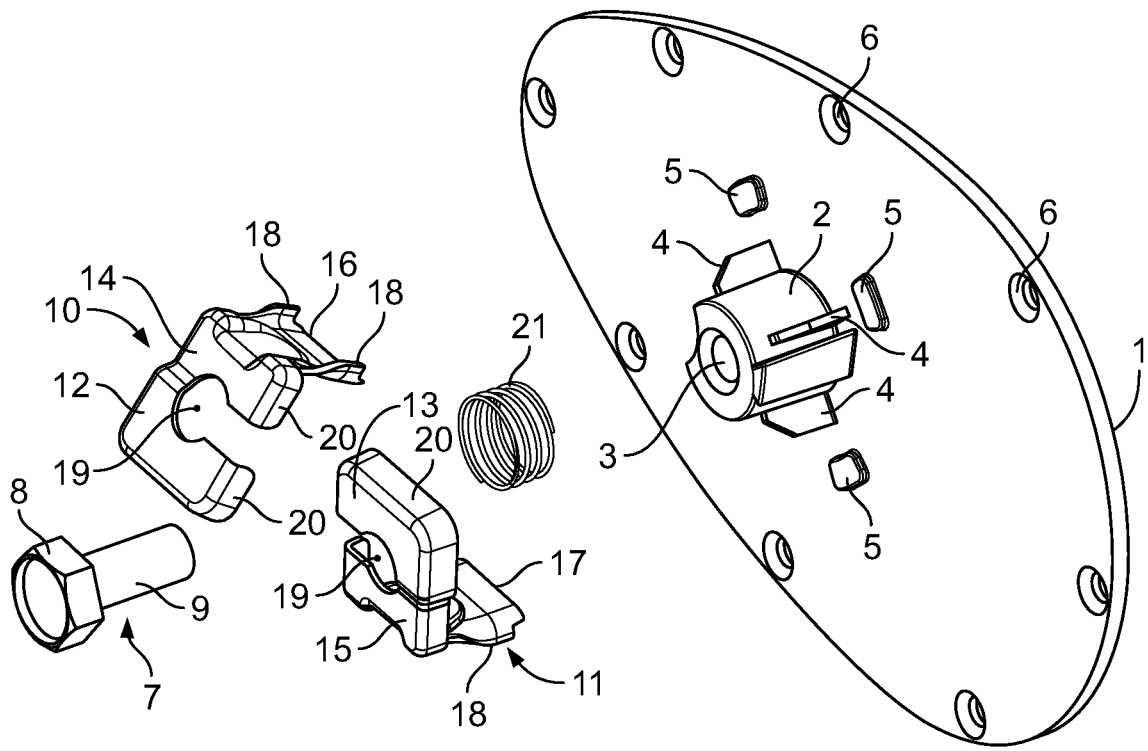
FIG. 1 is an exploded perspective view of an antenna device and an attachment arrangement according to an embodiment with separated expansion element parts.

In the following, the invention is explained in greater detail with reference to the accompanying drawings, in which exemplary embodiments are shown. In the figures, the same reference numerals are used for elements that correspond to one another in terms of their function and/or structure. According to the description of the various aspects and embodiments, elements shown in the drawings can be omitted if the technical effects of those elements are not needed for a particular application, and vice versa: i.e. elements that are not shown or described with reference to the figures but are described above can be added if the technical effect of those particular elements is advantageous in a specific application.

An antenna device and an attachment arrangement are shown in FIG. 1. For the sake of simplicity, the elements required for the functioning of the antenna device, such as antennas for receiving or transmitting high-frequency signals, printed circuit boards, foils or the like (on which the antennas are arranged), mechanical configurations (such as an antenna cover, seals and the like) and electrical configurations (such as cabling, plug connectors and the like) are not depicted, but are present.

The antenna device depicted in FIG. 1 has a base plate 1 which is equipped on its underside with an elevation, in particular a dome 2. The base plate 1 is made of plastic or metal. The dome 2 protrudes from the underside, but can also only or additionally be oriented in the direction of the other side of the base plate 1. It is also conceivable that this dome 2 can be dispensed with. The dome 2 has a threaded opening 3. Over its circumference, the dome 2 is equipped with at least one support 4, in the shown embodiment with precisely four supports 4. Protrusions 5 are present on the underside of the base plate 1. By these protrusions 5, the underside of the base plate 1 is kept spaced apart from an upper side of a bodywork surface, which is required in particular if a seal and/or an underside of an antenna cover projects over the underside of the base plate 1 over the circumference of the side rim of the base plate 1, in order to bring about uniform bearing of the antenna device on the bodywork surface. To attach an antenna cover, which is not depicted, the base plate 1 may have a plurality of breakthoughs 6 distributed over its circumference, through which screws, for example, are fed, by which screws the antenna cover and the base plate 1 are connected to one another.

The front ends of the supports 4 are in particular selected such that they correspond to side rims of a recess in the bodywork surface (not depicted yet in FIG. 1), in order to guide the antenna device in a targeted manner after placement onto the bodywork surface and to arrange it in a defined premounting position.

The further elements of the attachment arrangement are an actuating element in the form of a screw 7. The screw 7 has a screw head 8 and a threaded piece 9. The threaded piece 9 corresponds to the internal thread in the threaded opening 3 in the dome 2. An internal thread may also be provided only in the base plate 1, for example (omitting the dome 2). The actuating element may alternatively also be formed as a latching element or as an expansion element. However, the configuration of the actuating element as a screw 7 applies defined forces in order to fix the antenna device permanently on the bodywork surface of the vehicle. This may be done, for example, by tightening the screw 7 with a torque wrench.

Figure 2:
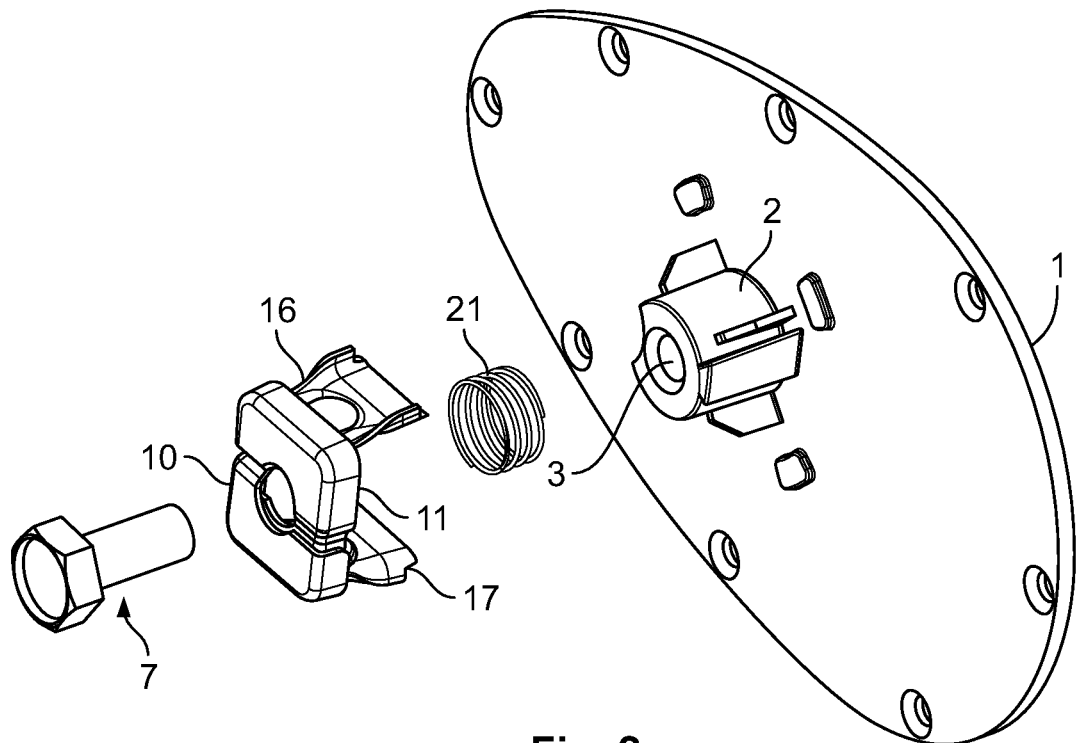
FIG. 2 is an exploded perspective view of the antenna device and the attachment arranged with the expansion element parts mated.

As shown in the embodiment of FIGS. 1 and 2, a first expansion element part 10 and at least one further expansion element part 11 are provided to form a single expansion element of the attachment arrangement. In the following description and the figures, it is assumed that precisely two expansion element parts 10,11 are present to form one single expansion element. However, it is also conceivable that more than two expansion element parts are employed to form a single expansion element. The two expansion element parts 10,11 each have a flat area 12,14 and 13,15 respectively. In an embodiment, the respective flat areas 12,14 and 13,15 respectively are located in one and the same plane. However, in the embodiment shown in FIG. 1, the respective flat areas 12,13 and 14,15 of the two expansion element parts 10,11 are arranged offset from one another.

Each expansion element part 10,11, starting from the associated flat area 14 and 15 respectively, has a side arm 16 and 17 respectively, as shown in FIGS. 1 and 2. The side arm 16,17 protrudes approximately at a right angle from the flat area 14,15. On an upper surface of the side arms 16,17 which points outwards, there is provided at least one angled region 18 in each case. In the embodiment shown in FIG. 1, one angled region 18 is present in each case in the lateral elongate end areas of the side arms 16,17 and is oriented in a longitudinal direction of the side arm 16,17. As shown in FIGS. 1 and 2, these angled regions 18 have been correspondingly bent in the lateral end area of the side arms 16,17, for example during the manufacture of the respective expansion element part 10,11 in a stamping-bending method. In the shown embodiment, the angled region 18 ends at a distance from a front end of the side arm 16,17 and has an arcuate shape at the front end.

In the central area of the flat areas 12,14 and 13,15 respectively (regardless of whether these flat areas are arranged in one plane or offset from one another), there is present in each case one breakthrough 19 for the actuating element, in particular the screw 7, as shown in FIGS. 1 and 2. The breakthrough 19 is not circumferentially closed, but rather has an opening outwards to the side (for example in the form of a slot). The two expansion parts 10,11 need not necessarily be laterally open. Alternatively they may also have a breakthrough 19 at the front or back, i.e. they may be open.

This opening causes the two expansion element parts 10,11 to be able to be mated by a movement transverse to the axial orientation of the actuating element, in particular the screw 7. This process takes place by way of the two expansion element parts 10,11 firstly being applied to one another at a particular angle and then mated (inserted into one another). Thereafter, the two mated expansion element parts are pivoted so that the flat areas 12,14 of the first expansion element part 10 come to rest flatly on the associated flat areas 13,15 of the further expansion element part 11. The completed mating process and completed pivoting and thus the final orientation of the two expansion element parts 10,11 for forming a single expansion element are shown in FIG. 2.

The flat areas 12-15 are oriented parallel to one another as shown in FIG. 2. As a result, the two expansion element parts 10, 11 form a double layer around a single passage opening for the actuating element, so that as a result either the area which arises is strengthened around the passage opening overall or the individual flat areas 12-15 of the at least two expansion element parts 10,11 can be formed thinner in terms of the material. Without mating the two expansion element parts 10,11 and subsequently pivoting them, there is not yet any functional expansion element available for the attachment arrangement of the antenna device. Furthermore, mounting would not yet be possible previously because no unambiguous passage opening is formed for the actuating element.

As shown in FIG. 1, in this exemplary embodiment, an edge area 20 is present around the flat areas 12-15. The edge area 20 can also only be present in one of the two expansion element parts 10,11. In the case of an expansion element part 10,11, the edge area 20 too is manufactured from a metal substance in the stamping-bending method. The pivoting process of the two expansion element parts 10,11, after mating, is supported by the edge area 20 and causes the two expansion element parts 10,11, after pivoting, to be located in a defined position relative to one another which they can no longer leave without a further reverse pivoting movement. The above-described mating of the individual parts 10,11 is also not necessarily required: alternatively, the two parts can be laid over one another and only be secured by the screw 7.

In an embodiment, the expansion element parts 10,11 are formed from a plastics material or a metal substance. If plastic is used, the expansion element parts 10,11 can be manufactured inexpensively, precisely and in large quantities in a plastics injection-molding method. This is particularly appropriate if the expansion element parts do not have to take on any electrical function. However, if, for example, a ground connection of the antenna device to further electrical units within the vehicle is required, for example via the electrically conductive bodywork surface, the expansion element parts 10,11 are formed from a metal substance. In such a case, the manufacture can be carried out in a known stamping-bending method, for example, wherein the desired geometry of the respective expansion element part 10,11 is formed from a flat sheet-metal material. In order to form a single expansion element from two (or where necessary more than two) expansion element parts 10,11, expansion element parts made of identical materials (i.e. either made only of plastic or only of a metal substance) are used. However, it is also conceivable, for example, to mate one expansion element part made of plastic and one expansion element part made of a metal substance to form the single expansion element.

In an embodiment, the at least two expansion element parts 10,11 are configured as identical parts (either made of plastic or made of a metal substance). This simplifies the manufacture of the expansion element parts 10,11, reduces the variety of parts and increases the ease of mounting because the necessity of mating two different parts is effectively avoided.

In order to perform prestressing of the mated and pivoted expansion element parts 10,11 at the base plate 1, a spring element 21 shown in FIGS. 1 and 2 is present. In this exemplary embodiment, the spring element 21 is formed as a spiral spring, through which the screw 7 is fed. As a result, the spiral spring is arranged in a targeted manner on the attachment arrangement and the base plate 1 and as a result, in the premounting position, can hold the expansion element in a defined state.

Figure 3:
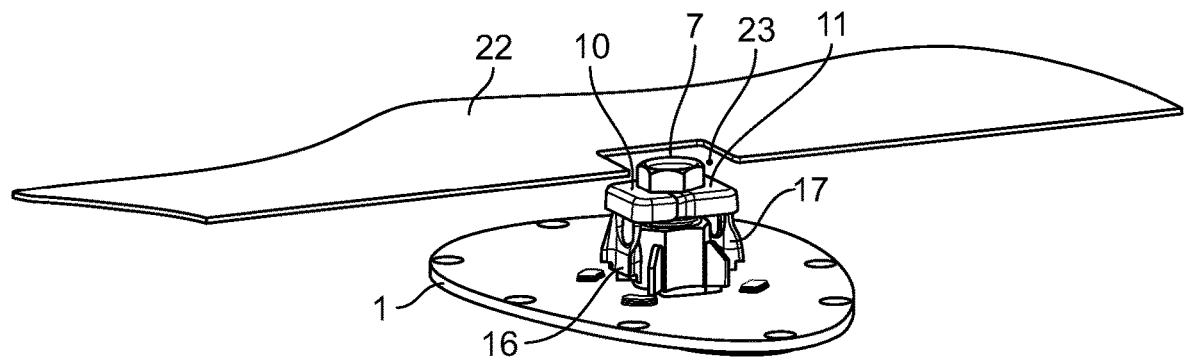
FIG. 3 is a perspective view of a premounting position of the antenna device and the attachment arrangement on a bodywork surface.

After the required elements of the attachment arrangement have been described in view of FIGS. 1 and 2, reference is made to FIG. 3. As shown in FIG. 3, the underside of the base plate 1 is applied in the direction of the upper side of a bodywork surface, in particular of a vehicle roof 22. The bodywork surface has a cutout 23, through which the attachment arrangement of the antenna arrangement is fed, this attachment arrangement having been prepared on the underside of the base plate 1.

The premounting position of the attachment arrangement of the antenna device is thus depicted in FIG. 3. It can be seen that the two mated expansion element parts 10,11, pivoted in accordance with FIG. 2, are fixed to the dome 3 and prestressed. This takes place as a result of the threaded piece 9 of the screw 7 having been fed through the now fully closed passage opening, which has been formed by the two expansion element parts 10,11, and the spring element 21, in particular the spiral spring, having likewise been pushed onto the threaded piece 9. Thereafter, this unit has been moved in the direction of the underside of the base plate 1, the end of the threaded piece 9 of the screw 7 having been screwed somewhat into the threaded opening 3 of the dome 2. As a result, the premounting position shown in FIG. 3 is achieved.

Figure 4:
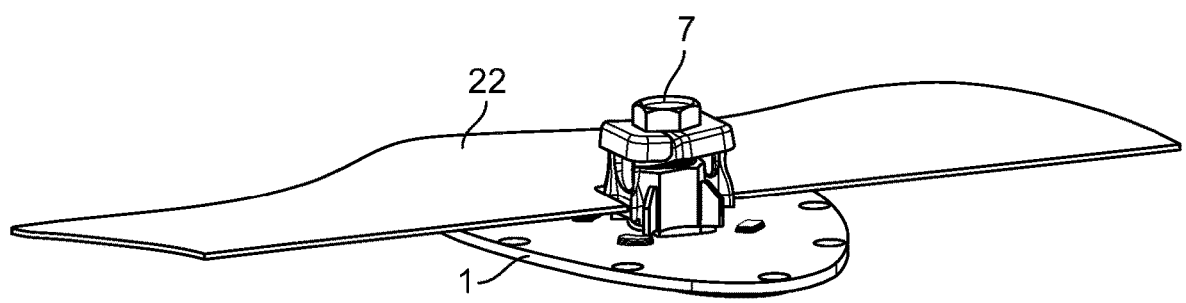
FIG. 4 is a perspective view of a state in which the antenna device and the attachment arrangement are fed into a recess of the bodywork surface.

The prepared antenna device is moved, with the attachment arrangement at the front, in the direction of the upper side of the bodywork surface, wherein the attachment arrangement is fed through the recess 23 in the bodywork surface, in particular the vehicle roof 22, until the underside of the base plate 1 comes to rest on the upper side of the bodywork surface. This step is depicted in FIG. 4. In this case it can be seen that, while the attachment arrangement is being fed through the recess 23, the respective front end of the angled regions 18, which runs in an arcuate manner in an embodiment, comes to rest on the circumferential rim of the recess 23. This in turn causes the two side arms 16,17 of the respective expansion element part 10,11 to be pressed together in the direction of the central axis of the attachment arrangement, which runs through the screw 7, this pressing-together being occurring against the spring force of the spring element 21. This pressing-together is structurally enabled in that the two expansion element parts 10,11 can be pivoted somewhat relative to one another about an axis transverse to the central axis of the attachment arrangement. As a result, it is also possible to see the advantage that the expansion element parts 10,11 themselves, in particular their side arms 16, do not have to provide any spring effect or prestressing when the antenna device is moved from its premounting position in the direction of the end position. The spring effect or prestressing is only made available by the spring element 21 or, in an alternative configuration, by omitting the spring element, is not generated at all.

Figure 5:
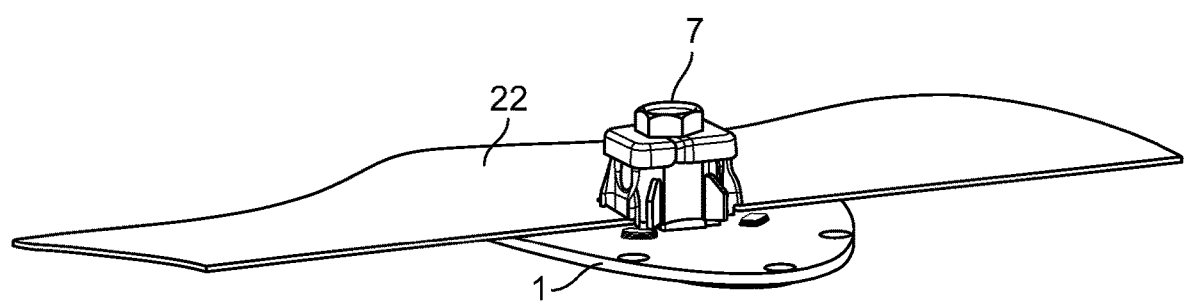
FIG. 5 is a perspective view of a final mounting position of the antenna device and the attachment arrangement on the bodywork surface.

While, in FIG. 4, the movement of the antenna device is depicted during the feeding of the attachment arrangement thereof through the recess 23 in the vehicle roof 22 and while the screw 7 is also not moved out of the position which it occupies in the premounting position, the final mounting position (final position) is depicted in FIG. 5, in which final mounting position the antenna device is permanently arranged and fixed on the vehicle roof 22 (generally the bodywork surface of the vehicle). This final fixing has been achieved in that, after the base plate 1 has come to rest against the side of the bodywork surface in a parallel manner (if necessary spaced apart due to the protrusions 5 and/or a circumferential seal and around the base plate 1 and/or a lower rim of an antenna cover), the side arms 16 have again moved somewhat into their original position. In the exemplary embodiment, the final position of the side arms 16 is reached in that the remote end of the angled regions 18 comes to rest on the underside of the vehicle roof 22 and the stepped front side (the end) of the side arms 16 comes to rest on the circumferential rim of the recess 23. This process takes place automatically by appropriately adjusting the respective geometry when the base plate 1 has come to rest on the bodywork surface as intended. In other words, the side arms 16, due to the prestressing of these by the spring element 21, move back into the position they occupied in the premounting position and occupy the position depicted in FIG. 5. This position of the side arms 16, which is occupied in FIG. 5, can deviate somewhat from the original position of the side arms 16 in the premounting position which is depicted in FIG. 3. This means that, in the premounting position according to FIG. 3, the side arms 16 protrude somewhat more than in the finally mounted position, as is depicted in FIG. 5.

After the side arms 16 are pressed together due to the feeding of the attachment arrangement of the antenna device through the recess 23 in the bodywork surface, and after the side arms 16 are pivoted back again upon completion of the feeding-through as shown in FIG. 5, they bring about, as a result of their geometric shape, in particular in conjunction with the angled regions 18, a prelatching position of the antenna device so that this antenna device is firstly arranged in its final mounting position on the bodywork surface but not yet permanently effectively fixed. This fixing is carried out by tightening the screw 7, as a result of which the base plate 1 is moved (pressed on) just a little further in the direction of the upper side of the bodywork surface. This tightening of the screw 7 takes place with a predetermined torque, so that, once the predetermined torque has been reached, the antenna device is permanently fixed to the bodywork surface. Instead of rotationally moving the screw 7 to carry out fixing, it is also possible to conceive of fixing the antenna device permanently to the bodywork surface by a latching element, an expansion element or the like, which is employed instead of the screw 7.

In the movement sequence depicted in FIGS. 3-5, it can also be seen that the supports 4 protruding from the dome 2 bring about a guiding (due to their front slant which can also be configured in an arcuate manner) when the attachment arrangement is inserted into the recess 23. As a result, a targeted feeding of the attachment arrangement of the antenna device through the recess 23 and a predefinition of the orientation of the antenna device on the bodywork surface, in particular the vehicle roof 22, takes place.

The guiding described above may be present, but does not have to be present. A direction coding pin, for example, is also conceivable. A spike (pin) which projects out of the base plate, in front of or behind the locking mechanism, in the direction of the bodywork and which, during mounting, is inserted into a hole which determines the orientation of the roof antenna.

The movement sequence described with regard to FIGS. 3-5 and depicted therein can also obviously be reversed for removal. To do this, it is necessary to loosen the tightened screw 7 and press the side arms 16 together in the direction of the central axis of the screw 7. As a result, the locking of the attachment arrangement by the side arms 16 and their angled regions 18 in the region of the cutout 23 in the bodywork surface, which was required during mounting for pre-locking, is dispensed with. If the side arms 16 are pressed together in the direction of the central axis of the screw 7, which can be carried out by hand, for example, or also by a tool, the antenna device can be lifted off the bodywork surface and the attachment arrangement can be pulled out of the cutout 23.

In conclusion, an improved antenna device, in particular an attachment arrangement of an antenna device which is clearly improved compared to the prior art, is available according to the invention, which antenna device is constructed very compactly, requires fewer parts and is very simple to mount. The simplification can be seen in particular in that the antenna device can be prepared and made available with its attachment arrangement. Only thereafter is the antenna device, which is prepared in this manner, employed when finally mounted on the vehicle and can be handled very easily in this regard.

This antenna device and attachment arrangement of the invention has the advantage that only one single expansion element, consisting of two individual parts 10,11, is required in order to arrange and permanently fix the antenna device on a bodywork surface. The two expansion element parts 10,11 are provided for this purpose, with these not functioning in isolation but fulfilling the required function when mated. On the one hand, the two mated expansion element parts 10,11 form a circumferentially closed passage opening for the actuating element, with them being laterally open in their flat area 12,14 and 13,15 in the not yet mated state in order to enable mating, which takes place transverse to the axial orientation of the actuating element. Furthermore, the side arms 16,17 can be configured significantly simpler since it is not necessary to achieve a spring effect with these. The side arms 16,17 thus extend at an angle from the flat area 12,14 and 13,15 of the respective expansion element part in the direction of the base plate of the antenna device, such that the attachment arrangement of the antenna device, after being placed onto the bodywork surface of the vehicle, can be supported by the front end of the side arms 16,17 on the underside of the bodywork surface. In an embodiment, precisely two expansion element parts 10,11 form the single expansion element of the attachment arrangement. Consideration can also be given to using more than two expansion element parts 10,11 which are then arranged in a triangle, in a cross or the like and form the single expansion element of the attachment arrangement.

In the shown embodiment, the side arm 16,17 has two parallel angled regions 18. As a result, the entire strength of the attachment arrangement, with which the antenna device is arranged and fixed permanently and releasably on the bodywork surface, is significantly increased after the attaching process due to a uniform distribution of forces.

What is claimed is:

1. An antenna device for a vehicle, comprising:
   a base plate;
   an expansion element formed by a first expansion element part and a second expansion element part mated with the first expansion element part, each of the first expansion element part and the second expansion element part has a flat area, a side arm protruding at an angle from the flat area, and a laterally open breakthrough in the flat area open outward to a lateral side of the flat area; and
   an actuating element cooperating with the base plate and the expansion element, the laterally open breakthrough of each of the first expansion element part and the second expansion element part when mated forms a single passage opening for the actuating element.

2. The antenna device of claim 1, further comprising a spring element at the base plate, the first expansion element part and the second expansion element part are prestressed by the spring element.

3. The antenna device of claim 2, wherein the spring element is a spiral spring.

4. The antenna device of claim 1, wherein each of the first expansion element part and the second expansion element part has a pair of flat areas.

5. The antenna device of claim 4, wherein the pair of flat areas of the first expansion element part are offset from one another and the pair of flat areas of the second expansion element part are offset from one another.

6. The antenna device of claim 1, wherein each of the first expansion element part and the second expansion element part has an angled edge area around the flat area.

7. The antenna device of claim 1, wherein the side arm has an angled region oriented in a longitudinal direction of the side arm.

8. The antenna device of claim 7, wherein the angled region ends at a distance from a front end of the side arm.

9. The antenna device of claim 7, wherein the angled region has an arcuate shape at a front end.

10. The antenna device of claim 1, wherein the side arm has a pair of angled regions that are parallel to one another.

11. The antenna device of claim 1, wherein each of the first expansion element part and the second expansion element part are formed from a plastic material.

12. The antenna device of claim 1, wherein each of the first expansion element part and the second expansion element part are formed from a metal substance.

13. The antenna device of claim 1, wherein the first expansion element part and the second expansion element part are identical parts.

14. The antenna device of claim 1, wherein the laterally open breakthrough is open to the lateral side of the flat area in a direction perpendicular to the extension of the actuating element through the single passage opening.

15. The antenna device of claim 1, wherein the base plate has a plurality of protrusions on an underside of the base plate spacing the base plate from an upper side of a bodywork surface of the vehicle.

16. The antenna device of claim 15, wherein the base plate has a dome extending from the underside.

17. The antenna device of claim 16, wherein the dome has a plurality of supports corresponding to the bodywork surface of the vehicle.

* * * * *